(12) United States Patent
Porter et al.

(10) Patent No.: US 9,826,687 B1
(45) Date of Patent: Nov. 28, 2017

(54) HARVESTED BALE WRAPPING MATERIAL

(71) Applicant: L.P. Brown Company, Inc., Memphis, TN (US)

(72) Inventors: Kenneth L. Porter, Hernando, MS (US); James L. Hayes, Senatobia, MS (US)

(73) Assignee: L.P. BROWN COMPANY, INC., Memphis, TN (US)

( * ) Notice: Subject to any disclaimer, the term of this patent is extended or adjusted under 35 U.S.C. 154(b) by 343 days.

(21) Appl. No.: 14/106,536

(22) Filed: Dec. 13, 2013

Related U.S. Application Data

(60) Provisional application No. 61/736,613, filed on Dec. 13, 2012.

(51) Int. Cl.
- B32B 3/24 (2006.01)
- A01F 15/07 (2006.01)
- C09J 7/02 (2006.01)

(52) U.S. Cl.
CPC ........... *A01F 15/071* (2013.01); *C09J 7/0225* (2013.01); *Y10T 428/1476* (2015.01); *Y10T 428/15* (2015.01)

(58) Field of Classification Search
CPC . A01F 15/071; Y10T 428/1476; Y10T 428/15
USPC .......................................................... 428/43
See application file for complete search history.

(56) References Cited

U.S. PATENT DOCUMENTS

| | | | |
|---|---|---|---|
| 2,726,222 A | 12/1955 | Palmquist et al. | |
| 3,349,765 A | 10/1967 | Blanford | |
| 3,942,713 A | 3/1976 | Olson et al. | |
| 4,041,201 A | 8/1977 | Wurker | |
| 4,338,084 A | 7/1982 | Berthelseh | |
| 4,343,132 A | 8/1982 | Lawless, Jr. | |
| 4,416,392 A | 11/1983 | Smith | |
| 4,605,577 A | 8/1986 | Bowytz | |
| 4,688,368 A | 8/1987 | Honegger | |
| 4,768,810 A | 9/1988 | Mertens | |
| 4,778,701 A | 10/1988 | Pape et al. | |
| 4,801,480 A | 1/1989 | Panza et al. | |
| 4,917,928 A | 4/1990 | Heinecke | |
| 4,941,882 A | 7/1990 | Ward et al. | |
| 5,057,097 A | 10/1991 | Gesp | |
| 5,080,254 A | 1/1992 | Feer | |
| 5,234,517 A | 8/1993 | Pape et al. | |

(Continued)

FOREIGN PATENT DOCUMENTS

AU   2005300259 B2   5/2006
AU    200835557 B2  11/2009

(Continued)

OTHER PUBLICATIONS

U.S. Appl. No. 14/667,574, filed Mar. 24, 2015.

(Continued)

*Primary Examiner* — William P Watkins, III
(74) *Attorney, Agent, or Firm* — Wyatt, Tarrant & Combs, LLP; Stephen C. Hall

(57) ABSTRACT

A continuous roll of wrapping material for crops such as baled cotton wherein wrapping segments are set off by spaced transverse lines of slits or scoring for predictable separation during the wrapping process. Protection of the transverse lines and sealing assistance may be included by the addition of an adhesive layer and a V-fold over the transverse lines.

4 Claims, 22 Drawing Sheets

(56) References Cited

U.S. PATENT DOCUMENTS

| | | |
|---|---|---|
| 5,324,078 A | 6/1994 | Bane |
| 5,365,836 A | 11/1994 | Campbell |
| 5,497,903 A | 3/1996 | Yoneyama |
| 5,885,679 A | 3/1999 | Yasue et al. |
| 5,979,141 A | 11/1999 | Phillips |
| 6,008,429 A | 12/1999 | Ritger |
| 6,153,278 A | 11/2000 | Timmerman et al. |
| 6,453,805 B1 | 9/2002 | Viaud et al. |
| 6,514,585 B1 | 2/2003 | Pearson et al. |
| 6,550,633 B2 | 4/2003 | Huang et al. |
| 6,550,634 B1 | 4/2003 | Alegre De Miquel et al. |
| 6,632,311 B1 | 10/2003 | Glenna et al. |
| 6,663,932 B2 | 12/2003 | McLaughlin et al. |
| 6,685,050 B2 | 2/2004 | Schmidt et al. |
| 6,756,096 B2 | 6/2004 | Harding |
| 6,787,209 B2 | 9/2004 | Mass et al. |
| 6,901,723 B2 | 6/2005 | Jordan et al. |
| 6,971,542 B2 | 12/2005 | Vogel et al. |
| 7,165,928 B2 | 1/2007 | Haverdink et al. |
| 7,541,080 B2 | 6/2009 | Mass et al. |
| 7,636,987 B2 | 12/2009 | Derscheid et al. |
| 7,694,491 B2 | 4/2010 | Noonan et al. |
| 8,071,196 B2 | 12/2011 | Goering |
| 2002/0172792 A1 | 11/2002 | Jarvis et al. |
| 2005/0034429 A1 | 2/2005 | Mass et al. |
| 2007/0152010 A1 | 7/2007 | Denen et al. |
| 2007/0240389 A1 | 10/2007 | Frerichs |
| 2011/0311749 A1* | 12/2011 | McNeil ............... A47K 10/16 428/43 |
| 2012/0148783 A1* | 6/2012 | Kunkleman ............ B62B 5/069 428/43 |
| 2013/0221078 A1 | 8/2013 | Skelton |
| 2014/0263590 A1 | 9/2014 | Skelton |
| 2016/0151994 A1* | 6/2016 | Castillo ................. B65D 65/14 428/41.8 |

FOREIGN PATENT DOCUMENTS

| | | |
|---|---|---|
| GB | 2233962 A2 | 1/1991 |
| WO | 0061359 A2 | 10/2000 |
| WO | 0061359 A3 | 10/2000 |
| WO | 2015010151 A1 | 1/2015 |

OTHER PUBLICATIONS

The United States Patent and Trademark Office: The International Search Report and Written Opinion of the International Searching Authority, or the Declaration; International Search Report and Written Opinion for PCT/US2015/022330; Jun. 18, 2015; pp. 1-12; The United States Patent and Trademark Office; U.S.

* cited by examiner

Fig. 13a
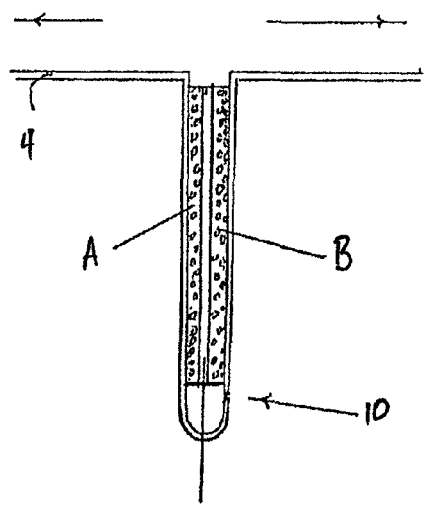
Fig. 13b
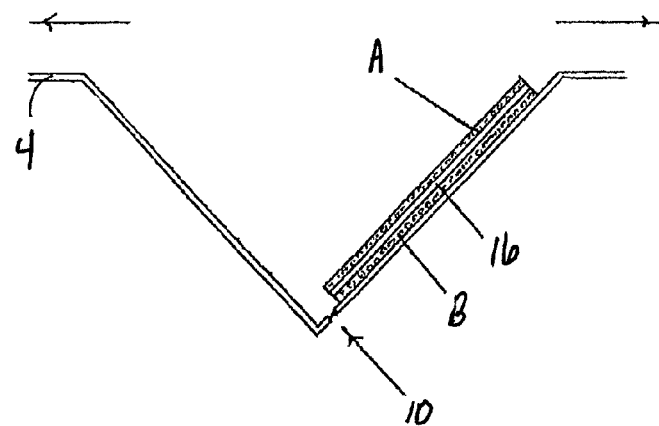
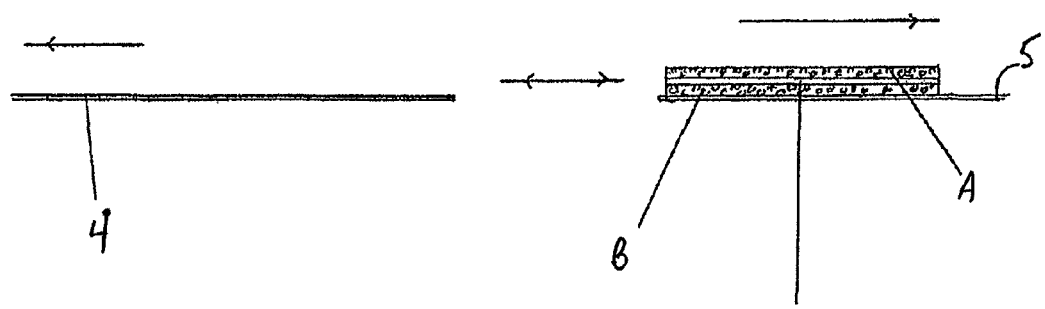
Fig. 13c

Fig. 14a
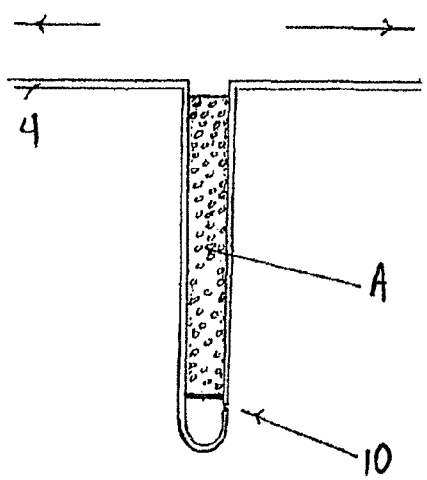
Fig. 14b
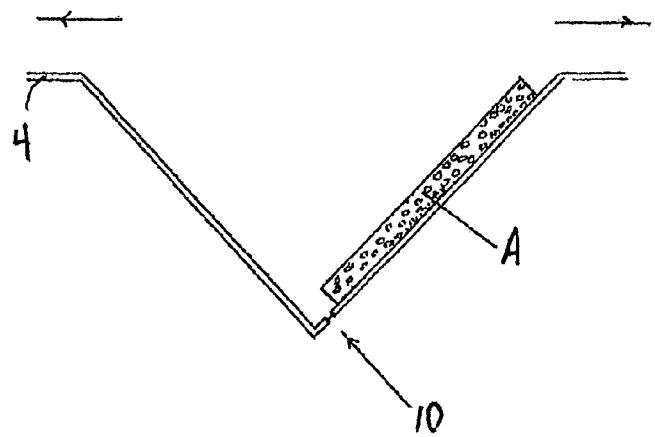
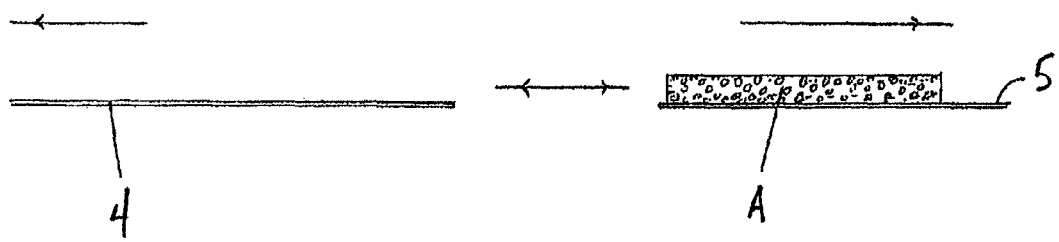
Fig. 14c

Fig. 15a
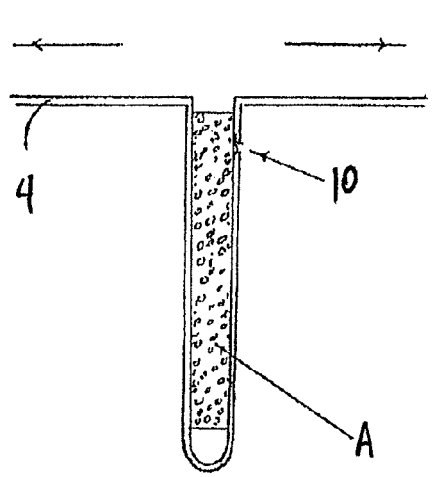
Fig. 15b
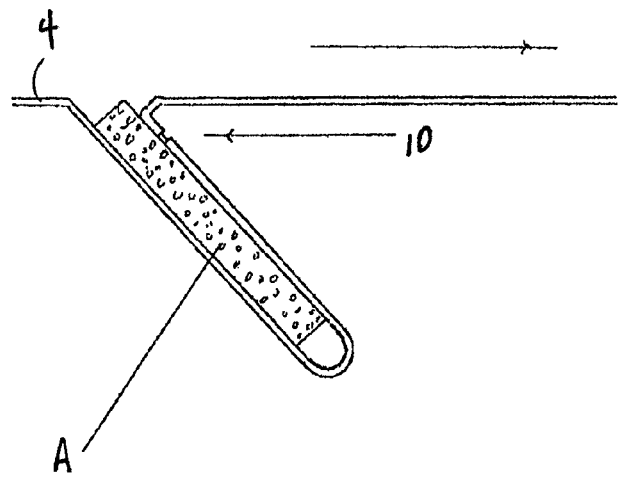
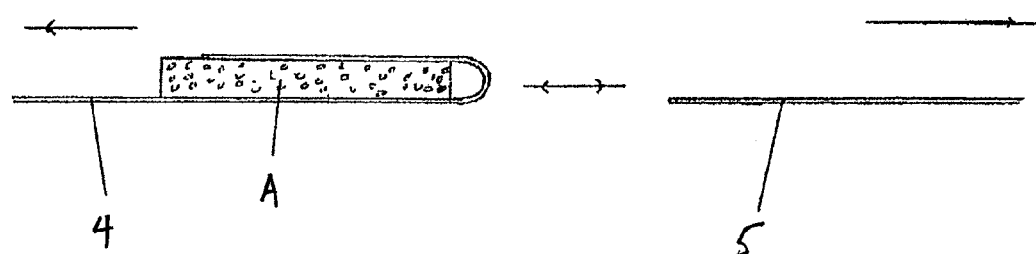
Fig. 15c

HARVESTED BALE WRAPPING MATERIAL

FIELD OF THE INVENTION

Harvesting of agricultural crops including hay and cotton are accomplished by a self propelled machine that collects the crop and compresses it into successive bales. In the instance of cotton, the bale is cylindrical measuring about 90 inches in diameter and 91 inches in height. Again, in the instance of cotton, the bale may be preferably wrapped with such as a plastic sheet material to hold the bale together and isolate it from the weather/rain in the field until the bales may be collected for further processing.

BACKGROUND OF THE INVENTION

The present invention is directed to a sheet of rolled wrapping material for use in an agricultural baler to securely wrap a harvested cylindrical bale. In the process of wrapping during the harvesting, the wrapping material must be securely bound to the bale's underlying, beginning perimeter end in order to ensure protection against the elements in the field. Secondly, there must be a mechanism within the wrapping material to separate the active wrapping segment for the bale from the available wrapping material on a roll contained in the baler. Presently available wrapping materials include rolls of individual wrapping segments successively joined via elaborate Z-folds including multiple interacting adhesive layers to form an otherwise 'continuous roll' of segments. Further, the trailing end of each segment, as part of the Z-fold, has an adhesive surface to seal the end of the wrap on the bale to the wrapping surface immediately beneath it. (See U.S. Pat. Nos. 6,787,209 and 7,541,280)

In addition to multiple issues with the various adhesive layers in respect of securing the wrapping segments successively together and securing the tail end of the wrap segment to the bale, there are additional issues with the security of the wrap in respect of the exposure of the wrapped bale to temperature swings, wind and rain such that the present material is less than totally satisfactory. There are also issues of individual wrapping portions (segments) becoming entangled in the wrapping machinery due to premature separation and/or exposure to the adhesive systems. Adding further to the issues is the cost of the manufacture of the multi-segmented roll of wrapping material.

The present invention is directed to a wrapping system including a continuous sheet of wrapping material, rolled on a roller which may be unrolled to envelope a rolled bale. The wrapping material of the present invention has wrapping segments identified by the periodic disposition of a transverse line of slits or a scoring in the material placed uniformly along its length to identify wrapping segments. The effect of the series of slits or scoring in the transverse line is to weaken the material along a proposed parting line to enable the separation during a wrapping segment. A satisfactory result is achieved in machines such as illustrated in the patents identified above with a total of about 25 percent of the substrate slit by means of a plurality of small individual slits generally uniformly placed in the pmposed parting line. It is also notable that slit line configurations should not be limited to straight line slitting or scoring perpendicularly oriented across the web of wrapping material. For example, the configuration of the transverse parting line may be one or more connected, angular and/or curved segments. Likewise, depending upon the line configuration and length, the length of the slits may be varied.

Alternatively to the lines of independent slits which penetrate through the material, it has been discovered that the searability of the wrapping segments may be accomplished with a transverse line wherein the surface of the material has been scored with a blade, chisel or the like whereby the surface of the wrapping material has been weakened for separation. The scoring is accomplished by pulling a sharp edge across the material, creating a gouging which leaves a chamfer, trough or valley in the material substrate. This weakens the wrapping material similarly to the slits at the separation location such that the linear pull of the material causes a separation on the line of scoring or gouge, providing an effective separation at the desired location. The depth of the score or gouge is chosen such that sufficient strength remains in the wrapping material for normal handling, loading and manufacturing processes. The depth of scoring will vary depending upon the type, and thickness of the wrapping material, but a depth of about 10 percent of the material thickness is normally sufficient, but from 5 percent to about 50 percent may be satisfactory depending upon internal stresses imposed by the particular bailing machine imposed in the process and the thickness of the wrapping material.

SUMMARY OF THE INVENTION

A continuous roll of wrapping material for such as cylindrical bales of field crops as cotton, wherein wrapping segments are identified by successive lines of slits (preferably an in-line succession of straight and/or curved line of slits) or scoring at preselected lengths and, optionally, includes an adhesive layer adjacent the perforation, optionally in V-fold for providing protection from premature perforation separation plus a sealing section at the end of the segment. By these configurations, the individual wrapping segments are designated on the wrapping machinery during manufacture, the wrapping roll thus being made from one continuous sheet of wrapping material that may include a V-fold with an adhesive layer adjacent the perforation or scoring.

A preferred embodiment of a wrapping roll may include continuous roll of wrapping material for such as cylindrical bales wherein wrapping segments are identified by successive lines of slits, not limited to a straight in-line succession of slits, or scoring at preselected lengths and, optionally, includes an adhesive layer adjacent the perforation not contained in a V-fold, or an alternative protection from premature perforation separation plus a sealing section at the end of the segment. By this configuration, the individual wrapping segments are designated on the wrapping machinery during manufacture, the wrapping roll thus being made from one continuous sheet of wrapping material that does not include a V-fold over the adhesive layer adjacent the perforation.

BRIEF DESCRIPTION OF THE DRAWINGS

FIGS. 13a, 13b, and 13c are cross sectional drawings illustrating an alternative embodiment to the FIGS. 12a, 12b and 12c.

FIGS. 14a, 14b, and 14c are cross sectional drawings illustrating a further alternative embodiment to the FIGS. 12a, 12b and 12c.

FIGS. 15a, 15b, and 15c are cross sectional drawings illustrating a further alternative embodiment to the FIGS. 12a, 12b and 12c.

DESCRIPTION OF THE PREFERRED EMBODIMENT

Figure 1:
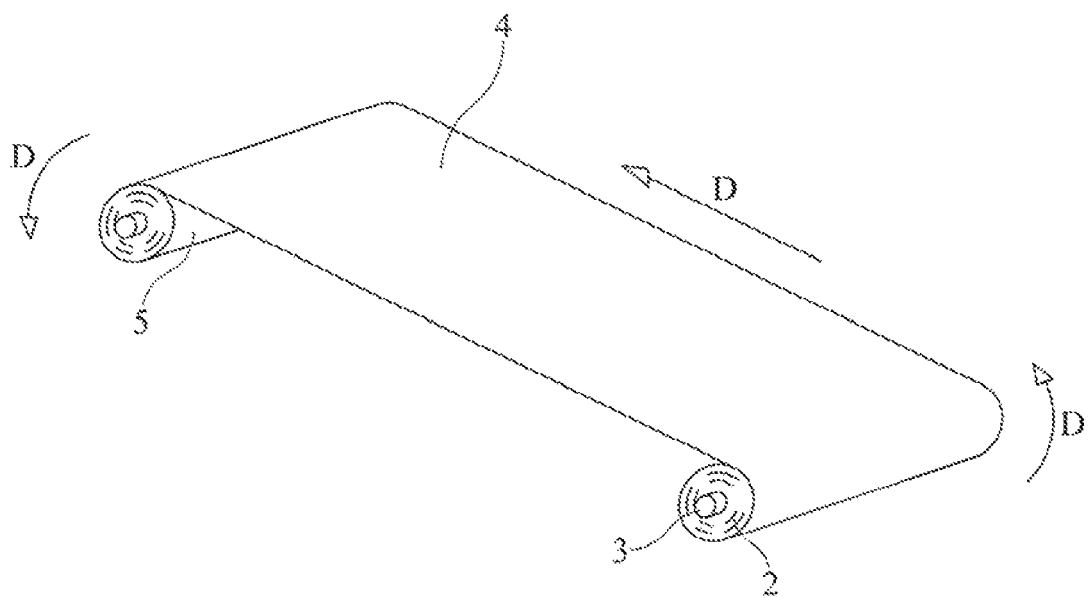
FIG. 1 is a perspective view of the wrapping material during the winding phase of a roll of wrapping material.

With reference now to the Drawings, and FIG. 1 in particular, the set-up for the manufacture of a sheet wrapping material according to the present invention is illustrated. A source of wrapping material 5 in an elongated, continuous sheet form is illustrated on raw material supply roll 2 to be processed into separable wrapping segments 6 (FIGS. 8, 9, 11) stored consecutively on reel or core 3. This material for use in the harvesting and wrapping of agricultural products, such as cotton, may be composed one or more of a variety of materials including polyolefin films, polyolefin nettings, woven or fibrous materials. The width of the wrapping material 5 should be sufficient to cover the width of the hale or other item being wrapped including overlapping and sealing the ends and thick enough to withstand the handling and elements of nature if left in the field for a period. Generally the thickness of the preferred wrapping material substrate 4 is from about 40 to about 120 microns and the length of a wrapping segment is from about 15 to about 25 meters, depending upon the harvested material. For the manufacturing process, sufficient raw material is contained, on a supply reel 2 to yield a field supply roll 3 of sufficient wrapping segments for harvesting, approximately 20 to 30 bales, to move in direction D.

Figure 2:
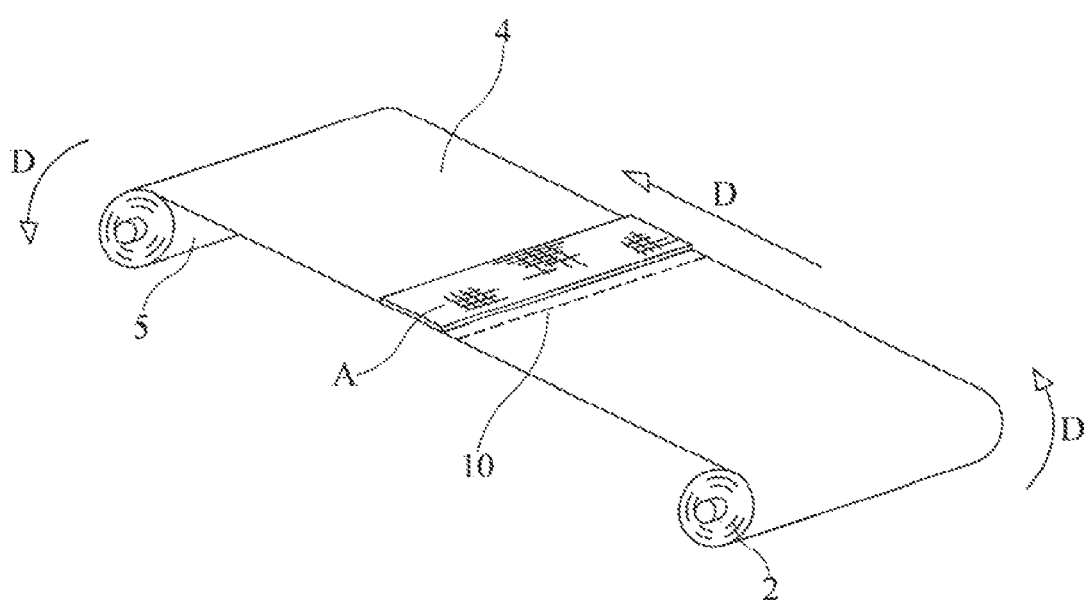
FIG. 2 is an alternative embodiment of the invention of FIG. 1 including a transverse line of slits and an adhesive layer.
Figure 2A:
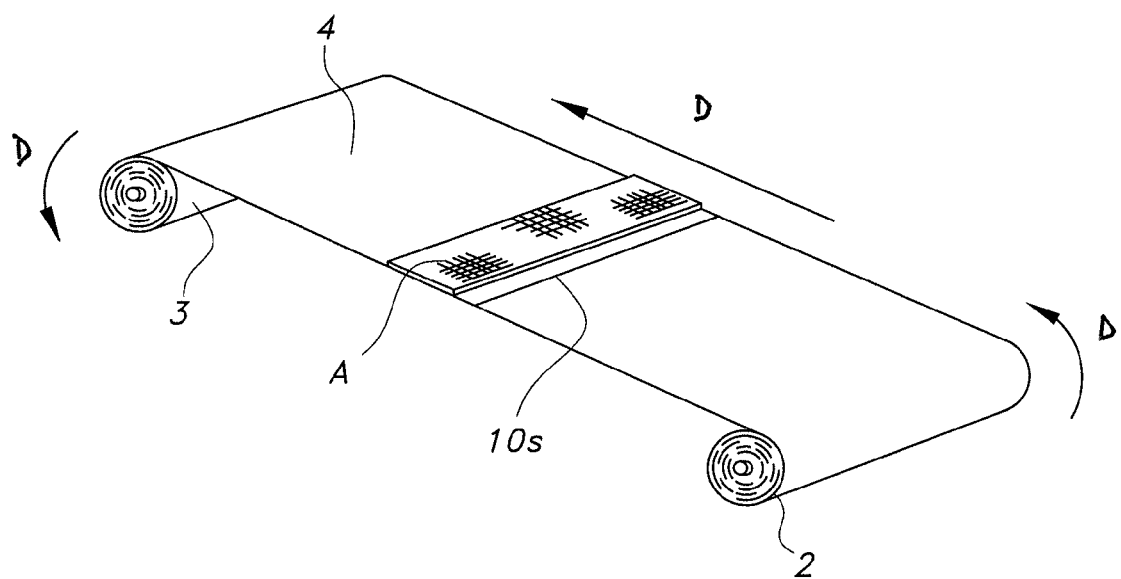
FIG. 2*a* is a partial side view of an alternative embodiment of the invention of FIG. 2 wherein the transverse line of slits is a scored or gouged line in the surface of the wrapping material.
Figure 2B:
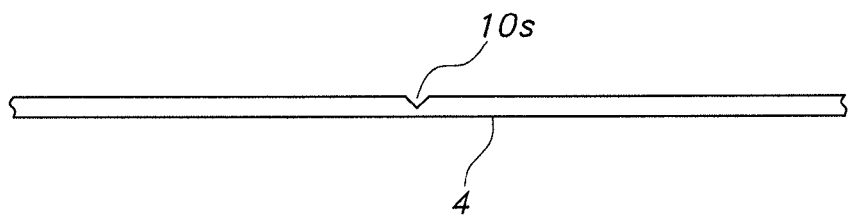
FIG. 2*b* is a cross sectional view of FIG. 2*a*.

In FIG. 2, an adhesive area A, along with transverse slits 10 (defined cuts through the material substrate with alternating uncut areas in between) are placed (perpendicularly) at spaced intervals along the continuum of material forming the wrapping material 5, The space between the intervals must be greater than the circumference of the item being wrapped. FIG. 2a illustrates the use of a transverse score line 10s in lieu of the transverse slits 10 of FIG. 2. As related above, the score line 10s runs continuously across wrapping material segment 4 from edge to edge.

Figure 3:
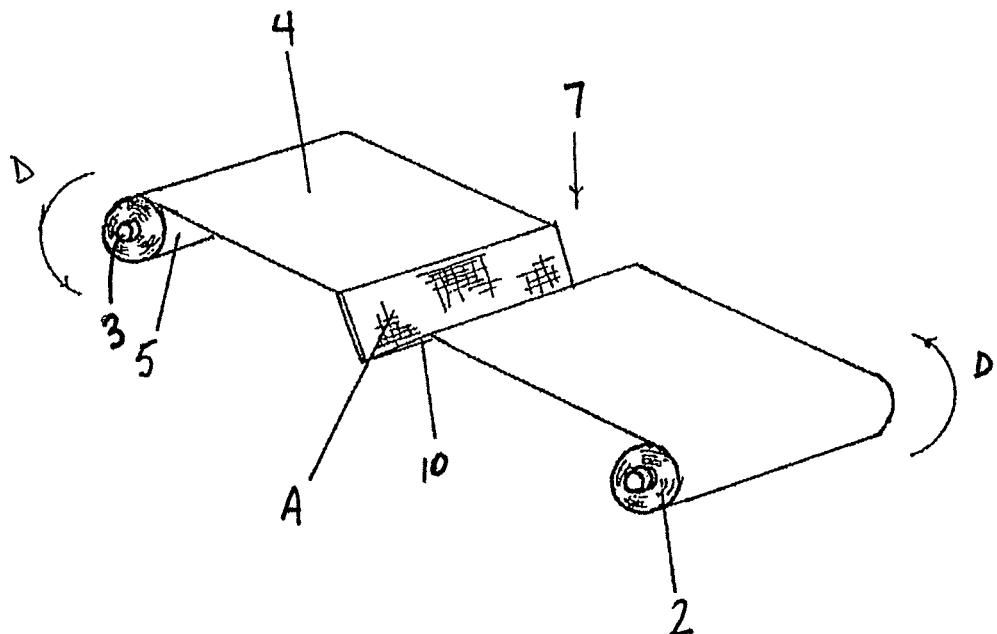
FIG. 3 is an alternative embodiment of the invention of FIG. 1 including the slit line and adhesive layer disposed in a V-fold.

In FIG. 3, the wrapping material substrate 4 is tucked into a V-shaped fold 7 that covers and protects the adhesive area A until it is unfolded when used in the wrapping cycle. It is desirable that the trailing edge of each formed wrapping segment installed on a bale be firmly secured against the layer of wrapping material substrate underneath it when wrapped around the item. This prevents the wrap from being loosened by the action of the wind, rain, etc. This can be accomplished by adhesives, or in the case of wrapping material substrates that adhere to themselves, it can also be accomplished in the absence of adhesive on the trailing edge of the wrapping portion. In the case where wrapping material substrates require an adhesive to secure the trailing edge of the wrapping portion, there are a variety of adhesives available that are commonly known to those that are skilled in the art. There are double sided adhesives (two adhesives separated by a boundary), and singular adhesives that could be laminated directly to the wrapping material substrate. The V-shaped fold 7 also protects the integrity of the transverse slits 10 from stress incurred during the wrapping cycle. The adhesive area A may or may not use a release liner (such as 8a in FIG. 8). Some wrapping material substrates may release from the adhesive as a function of their particular chemical makeup, or the wrapping material substrate may be treated to allow it to release from an adhesive layer (not shown) to expose the adhesive area A and the transverse slits 10 during the wrapping cycle.

Figure 4:
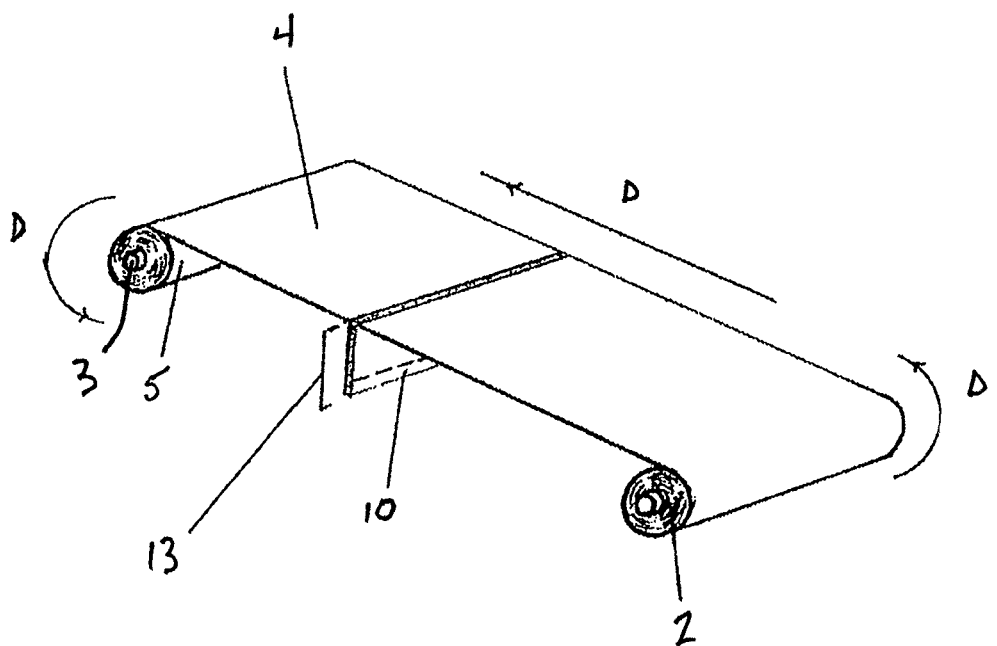
FIG. 4 is an alternative embodiment to the invention of FIG. 3 wherein the V-fold is closed.

FIG. 4 illustrates an example of the closed V-fold 13 in accordance with an embodiment of the invention. The closed V-fold 13 is shown as fully compressed, enclosing the adhesive area (A of FIG. 3) and containing the line of transverse slits 10 extending below the plane of the wrapping material substrate 4. The V-fold mechanism 7 then moves in the direction D to the roll of wrapping material 5, with the V-fold parallel and adjacent the wrapping material 5 to be rolled on to reel 3. This fold encloses the adhesive and transverse slits in a pocket that prevents the adhesive from wrongly sticking to winding machinery in the winding cycle or to the wrapping machinery during the wrapping cycle. It also keeps the transverse slits protected from any stressors other than those which occur at the end of each wrapping cycle when the particular wrapping segment (20 of FIG. 11) is separated.

Figure 5:
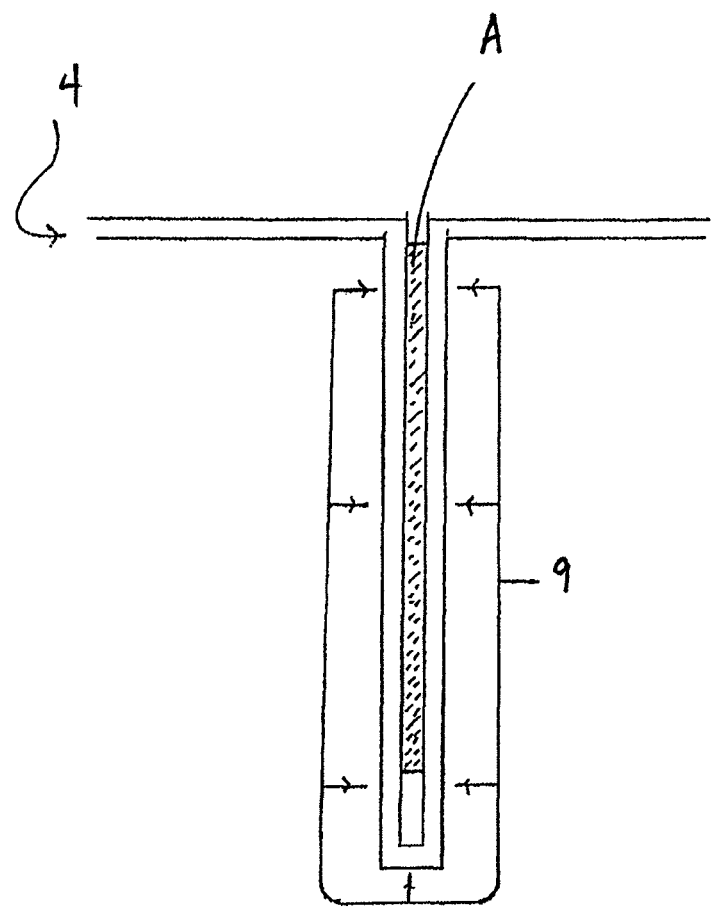
FIG. 5 is a side view of the V-fold area of the wrapping material of FIG. 4.

FIG. 5 is a side view of the V-fold (7 of FIG. 3) showing the wrapping material substrate 4, the location of the adhesive area A, and the range of allowable locations 9 for the transverse slits (10 of FIG. 4).

The V-fold 7 for forming and sealing wrapping portions is unique in that it allows for a variety of placement of the transverse slits and thus ultimately allowing for wrapping an item with or without a lateral sealing adhesive at the end of a wrapping portion, Depending on the nature of the wrapping material substrate, a lateral adhesive sealant at the tail end of a wrapping portion may not be necessary. However, in the absence of a mechanized cutting device on the wrapping machinery, a simple method of forming predetermined appropriate length wrapping segments, and a multifunctional adhesive containment mechanism is advantageous. Containing the transverse slits in the V-fold 7 allows for the formation of uniform length wrapping portions while maintaining the integrity of the slits during the stress of the wrapping cycle, and provides a system that promotes a more consistent containment of the adhesive area.

Figure 6:
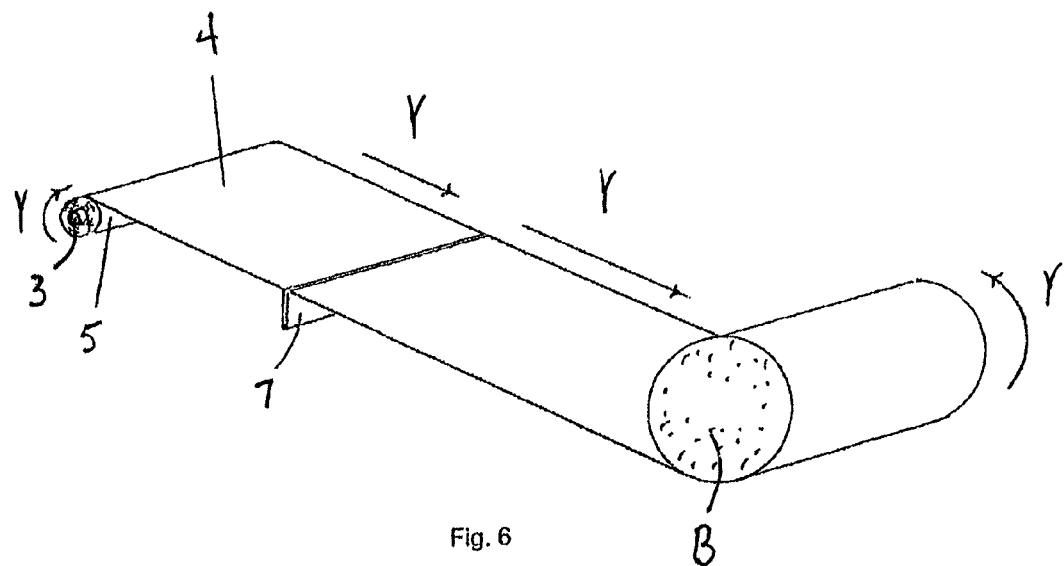
FIG. 6 is a perspective view of the invention of FIG. 4 wherein a bale is being wrapped.
Figure 7:
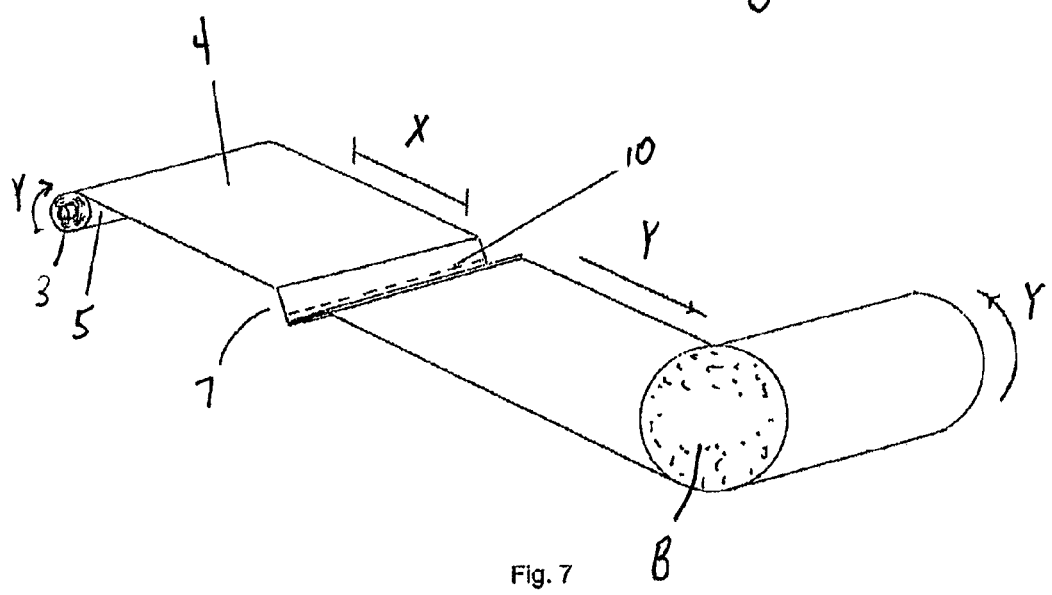
FIG. 7 is a view of the bale wrapping of FIG. 6 wherein the wrapping material roll has beenstopped and the rotating bale is beginning the separation of the wrapping segment.

FIGS. 6 through 11 illustrate a method of wrapping using the V-fold 7 in accordance with an embodiment of the present invention. FIG. 6 shows a roll 3 of wrapping material 5 containing a plurality of V-folds at regular spaced intervals. By way of example, the wrapping will be carried out on an agricultural baler known in the art for baling field harvested material, as utilized in the covering of items in rolls. In FIG. 6 the wrapping material substrate 4 is fed off the roll of wrapping material 5 in the direction Y, and wrapping the bale B. This occurs in harvesting machinery, i.e. a baler, such as illustrated in U.S. Pat. No. 7,197,979. In FIG. 7 after sufficiently wrapping the circumference of the bale B, the roll of wrapping material 5 comes to a complete stop X, while the bale B continuos to turn in the direction Y. FIG. 7 shows the unfolding of the V-fold 7 produced by the continued turning of bale B in the direction Y.

Figure 8:
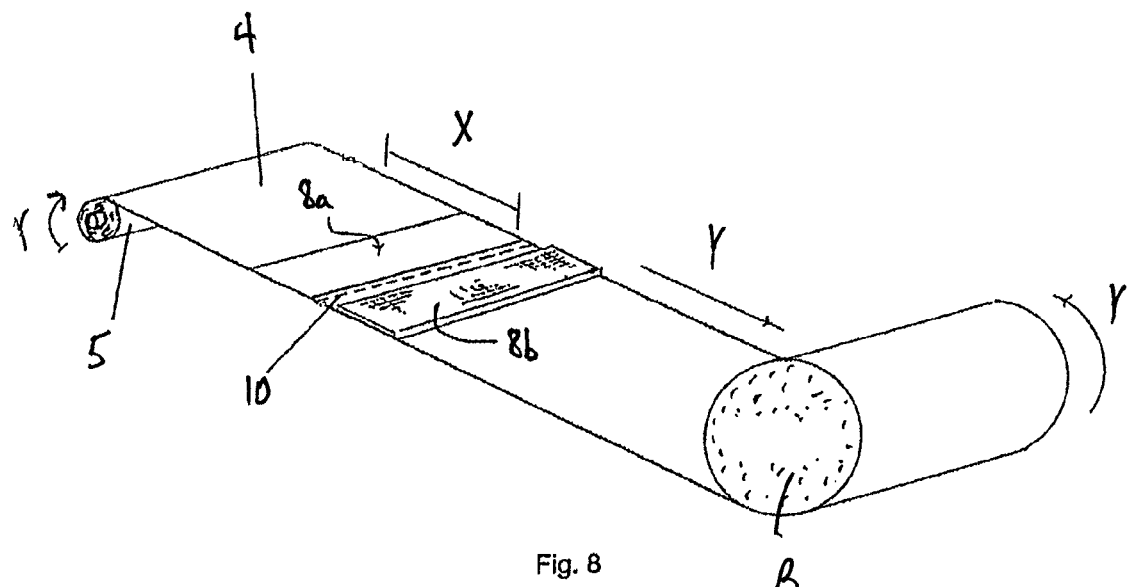
FIG. 8 is a pictorial of FIG. 7 wherein the wrapping material is at the slit separation point.

FIG. 8 shows the roll of wrapping material 5 as stationary in the region X and as the bale B continues to turn in the direction Y, the V-fold 7 returns to a linear configuration of the wrapping material substrate 4 having separated the adhesive area A into a releasable liner 8a and an adhesive layer 8b parallel to each other and on opposite sides of the transverse slits 10. In the event where a releasable liner is not used in conjunction with an adhesive, the separation will still occur leaving an adhesive layer 8b on the trailing edge of the formed wrapping portion, and no adhesive on the leading edge of the wrapping portion opposite to and parallel with said trailing edge.

Figure 9:
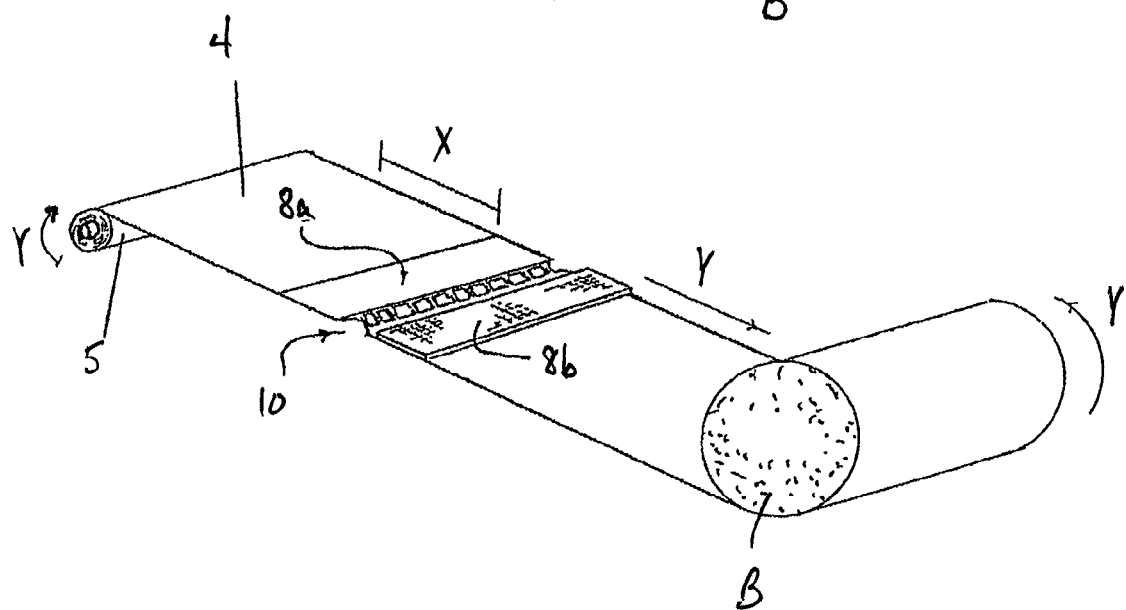
FIG. 9 is a pictorial of FIG. 8 wherein the slits are being drawn to separate the wrapping segment.

FIG. 9 shows the continued turning of bale B in the direction Y producing the elongation of the areas of the wrapping material substrate 4 between the transverse slits 10.

Figure 10:
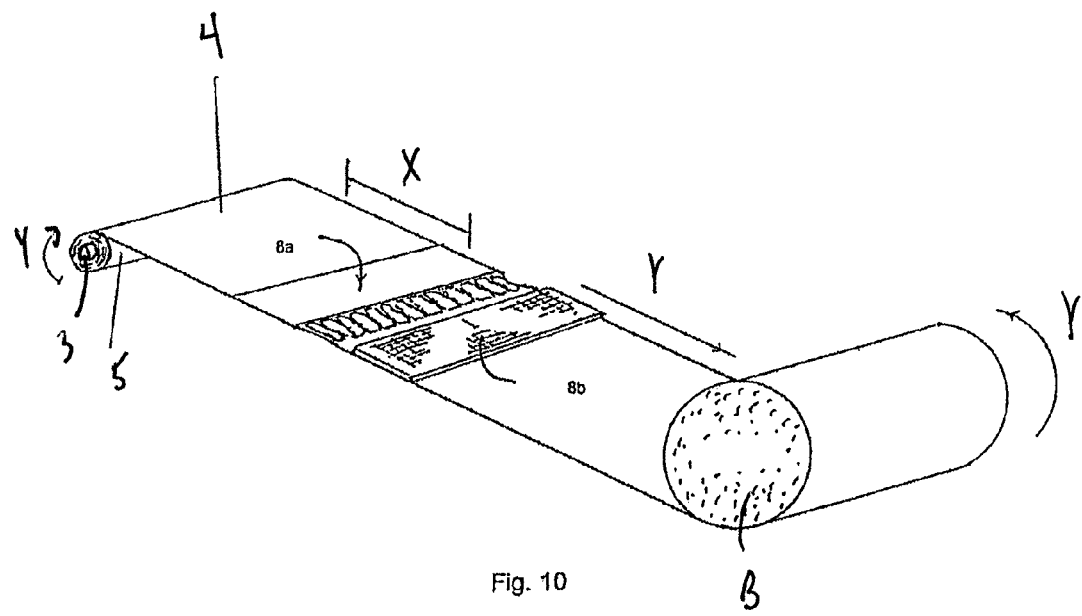
FIG. 10 is a pictorial of the further action illustrated in the embodiment of FIG. 9.

FIG. 10 shows the increased thinning and elongation of the material substrate 4 between the transverse slits 10 as the bale B continues to turn in the direction Y.

Figure 11:
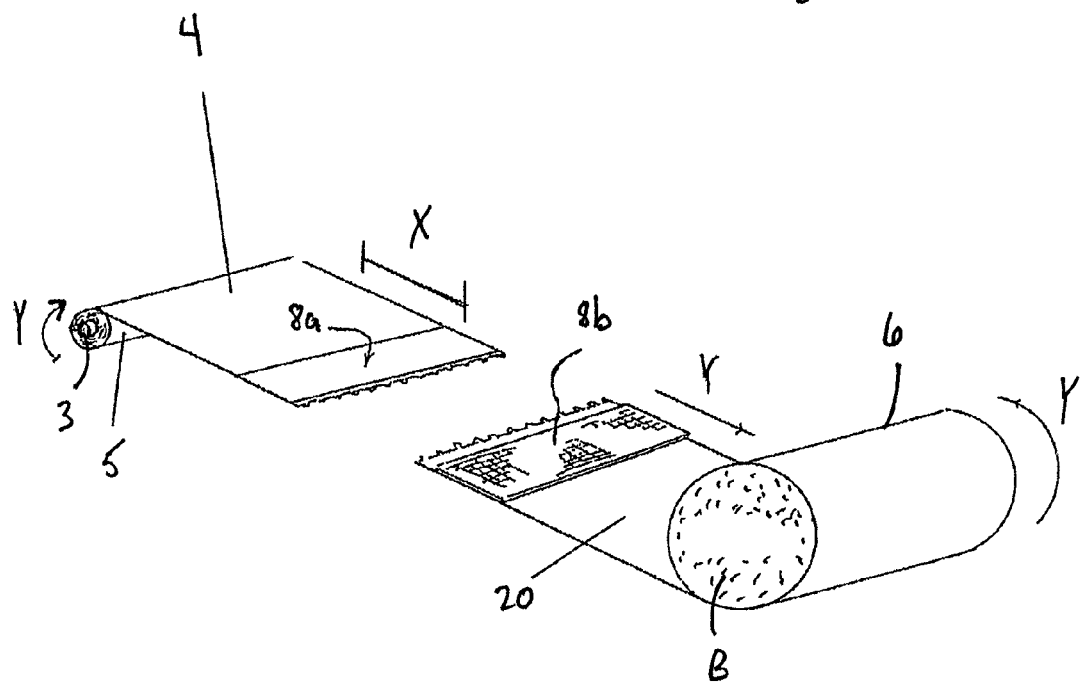
FIG. 11 is a pictorial view illustrating the full separation of the sheet wrapping segments of FIG. 10.

FIG. 11 shows the breaking of the material substrate 4 at the location of the transverse slits 10 and the formation of a distinct wrapping segment 20 carrying the adhesive layer 8b in the direction Y to laterally seal the end of the newly-formed wrapping portion 20.

Figure 12A:
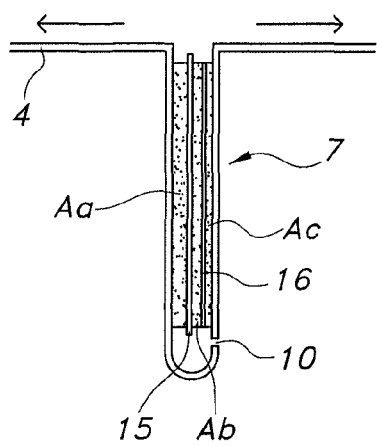
FIG. 12a is a cross-sectional view of one embodiment of the V-fold with multiple adhesive layers.
Figure 12B:
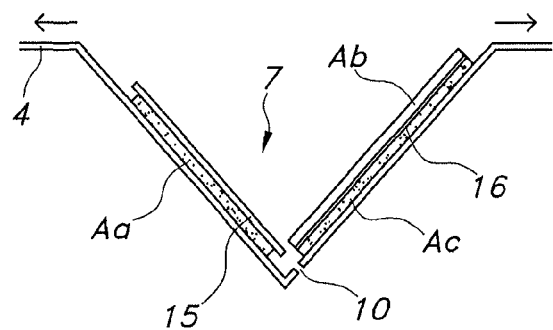
FIG. 12b is a cross-sectional view, of the V-fold of FIG. 12a shown partially separated.
Figure 12C:
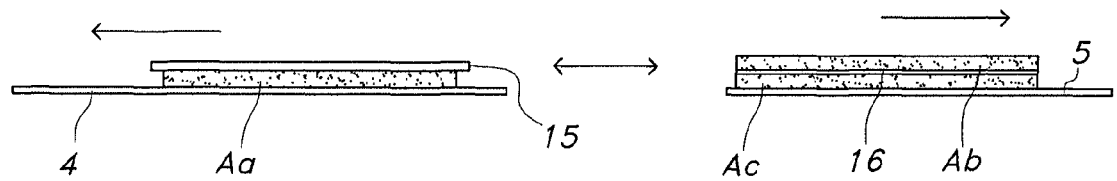
FIG. 12c is a cross-sectional view of the V-fold of FIGS. 12a and 12b, fully separated.

FIGS. 12a, 12b, and 12c illustrate an adhesive system using the V-fold mechanism in accordance with another embodiment of the present invention. This embodiment is used in conjunction with wrapping material substrates that do not adhere to themselves at the end of the wrapping cycle. In FIG. 12a, the V-fold mechanism 7 has a three-part adhesive system wherein there is the first adhesive Aa permanently attached to the wrapping material substrate 4 on one face and permanently attached on its opposite face to a release liner 15. Said release liner 15 is releasably attached on its opposite face to the second adhesive Ab and the said adhesive Abis permanently attached on its opposite face to an adhesive boundary 16. A third permanent adhesive Ac is permanently attached to the adhesive boundary 16 on the opposite face of the attachment of adhesive Ab to said adhesive boundary 16 and also permanently attached on its opposite face to the wrapping material 4. The transverse slits 10 are located in the open area at the bottom of the V-fold 7 below the lower edges of the adhesives Aa, Ab, and Ac. FIG. 12b shows the opening of the V-fold mechanism 7 as the wrapping material substrate 4 is pulled in the direction of the item being wrapped. The release liner 15 is pulled away from the permanent adhesive Ab. In FIG. 12c, the wrapping material substrate 4 is separated at the transverse slits leaving the release liner attached laterally to the newly formed leading edge of the wrapping material substrate 4, and the permanent adhesive Ab, now being laterally attached to the trailing edge of the newly-formed wrapping portion 5 and being pulled in the direction of the item being wrapped.

FIGS. 13a, 13b, and 13c illustrate an adhesive system using, the V-fold mechanism 7 in accordance with another embodiment of the present invention. This embodiment is used in conjunction with wrapping material substrates 4 that do not adhere to themselves at the end of the wrapping cycle. In FIG. 13a, the V-fold mechanism 7 has a two-part adhesive system wherein there is the first adhesive Aa is releasably attached to an adhesive boundary 16 on its opposite face. Said adhesive boundary 16 is permanently attached on its opposite face to a second adhesive Ac, and said adhesive Ac is permanently attached on its opposite face to the material wrapping portion 5. The transverse slits 10 are located in the open area at the bottom of the V-fold 7 below the lower edges of the adhesives Aa and Ac. FIG. 13b shows the opening of the V-fold mechanism as the wrapping material substrate 4 is pulled in the direction of the item being wrapped. The adhesive Aa is pulled away from the wrapping material substrate 4. In FIG. 13c, the wrapping portion 5 is separated at the transverse slits 10 leaving the wrapping material substrate4 without an attached liner as the newly formed leading edge of the wrapping material substrate 4, and the permanent adhesive Ac now being laterally detached from the trailing edge of the newly-formed wrapping portion 5 and being pulled in the direction of the item being wrapped.

FIGS. 14a, 14b, and 14c illustrate an adhesive system using the V-fold mechanism 7 in accordance with another embodiment of the present invention. This embodiment is used in conjunction with wrapping material substrates that do not adhere to themselves at the end of the wrapping cycle. In FIG. 14a, the V-fold mechanism 7 has a one-part adhesive system wherein the adhesive Aa is releasably attached to the wrapping material substrate 4 on one face and permanently attached on its opposite face to the material substrate 4. The transverse slits 10 are located in the open area at the bottom of the V-fold 7 below the lower edge of the adhesive Aa. FIG. 14b shows the opening of the V-fold mechanism 7 as the wrapping material substrate 4 is pulled in the direction of the item being wrapped. The adhesive Aa is pulled away from the material substrate 4. In FIG. 14c, the wrapping material substrate 4 is separated at the transverse slits 10 leaving the wrapping material substrate 4 without an attached liner as the newly formed leading edge of the wrapping material substrate 4, now a wrapping portion 5, and the adhesive Aa now being laterally attached to the trailing edge of the newly-formed wrapping portion 5 and being pulled in the direction of the item being wrapped.

FIGS. 15a, 15b, and 15c illustrate an adhesive system using the V-fold mechanism in accordance with another embodiment of the present invention. This embodiment is used in conjunction with wrapping material substrates that adhere to themselves at the end of the wrapping cycle. In FIG. 15a, the V-fold mechanism 7 has a one-part adhesive system wherein the adhesive Aa is permanently attached on one face to the wrapping material substrate 4 and also permanently attached on its opposite face to the same said wrapping material substrate 4. The transverse slits 10 are located at the upper portion of the V-fold mechanism 7. FIG. 15b shows the pulling away of the wrapping material substrate 4a from the V-fold mechanism 7 as the wrapping material substrate 4a is pulled in the direction of the item being wrapped In FIG.15c, the wrapping material substrate 4 is separated at the transverse slits 10 leaving the wrapping material substrate 4 as being folded over the adhesive Aa and laterally located on the newly-formed leading edge E of the wrapping material substrate 4, and the trailing edge of the newly-formed wrapping portion 5, not containing a sealing adhesive, being pulled toward the item being wrapped.

Figure 16A:
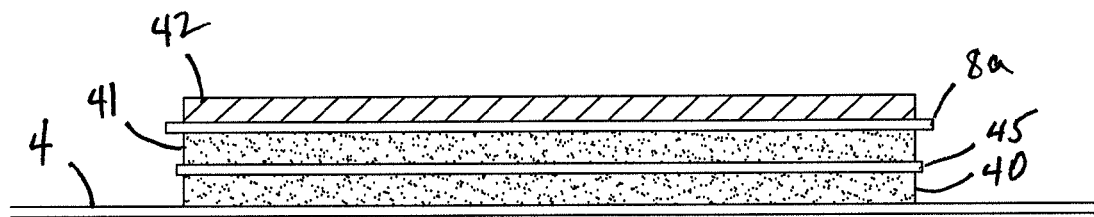
FIGS. 16A and 16B include pictorial views illustrating the layering of an adhesive backed, releasable liner over a permanent adhesive. The permanent adhesive can be either two layers of permanent adhesive separated by a boundary (16A), or a single layer without separation by a boundary (16B).
Figure 16B:
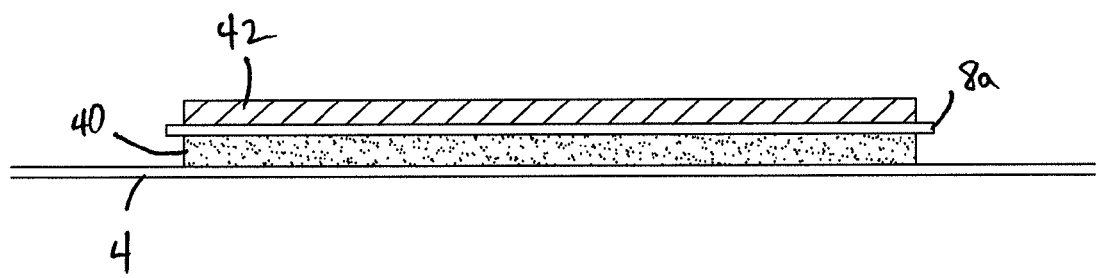

FIG. 16B illustrates the layering of the adhesive layers 40, 42 on the wrapping material substrate 4. It is to be noted that the permanent adhesive 40 is laid on the wrapping material substrate 4 and a releasable liner 8a is placed thereon. Permanent adhesive 42 is then laid on the releasable liner 8a. In the embodiments where a separation of adhesive is desired for joining adjacent layers of wrapping material, the embodiment of FIG. 16A is employed where an additional layer of releasable liner 45 and permanent adhesive 41 are employed. As illustrated in successive Figures, the additional layers are released in the wrapping process.

Figure 17A:
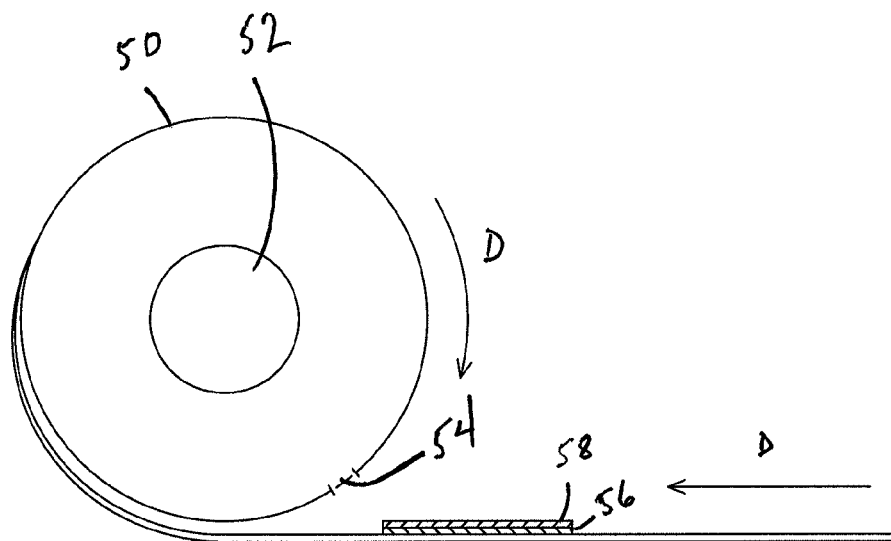
FIGS. 17A, 17B, and 17C include cross sectional views illustrating the windup phase of the adhesive area onto a roll of wrapping material during manufacturing whereby the releasable liner is attached to the feed material substrate, and the permanent adhesive, attached above the releasable liner, is rolled up against the wrapping material roll stock.
Figure 17B:
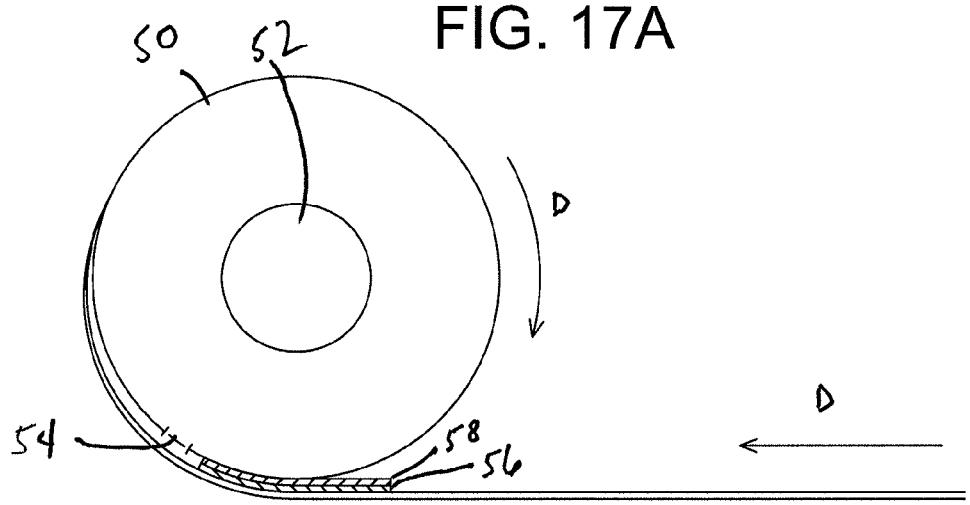

FIGS. 17a, b and c illustrate the windup of wrapping material on a roll in relation to the transverse slits by which separation of individual sheets of wrapping is accomplished. The relative placement of the transverse slits and the releasable adhesive is according to the wrapping usage. In the present embodiment, the slits are separated from the adhesive a distance relative to the circumference and diameter of the fully wrapped product processed by the wrapping machine. Likewise, FIGS. 17a, b and c respectively show a wrapping material roll 50 during a winding phase in which the roll is wound around a wrapping material core 52, while moving in a direction depicted by arrow "D," with the transverse slits labeled as 54 and with release liner 58 positioned over permanent adhesive 56. To make it adhere to the wrapping material, as seen in FIGS. 17b and c, release liner 58 has a permanent adhesive on its exposed surface opposite the permanent adhesive 56. On the other surface, release liner 58 is releasably attached to permanent adhesive 56 so they will separate as discussed for the unwinding phase.

Figure 18A:
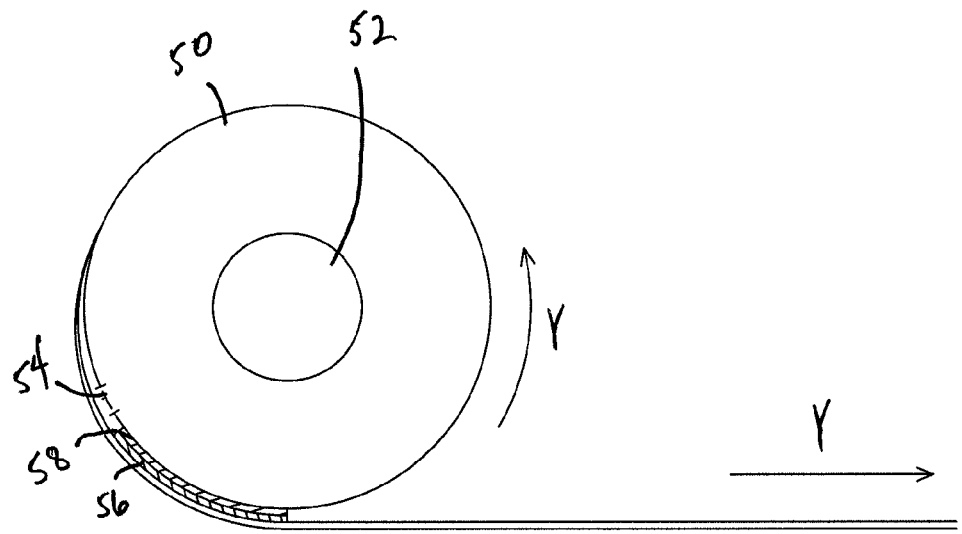
FIGS. 18A, 18B, and 18C include cross sectional views illustrating the unwinding phase of the wrapping material and consequent separation of the adhesive area whereby the releasable liner separates and is oriented above the feed wrapping material substrate, and the permanent adhesive remains on the wrapping material roll stock.

FIGS. 18a, b and c, illustrate the unwind phase of the wrapping material substrate. This occurs in the harvesting machine as the crop (cotton) is collected. The wrapping substrate is peeled out of the material roll as the crop has been collected and is to be wrapped. When the substrate has been pulled out such that the crop is covered, the machine brake stops release by the material roll and the pressure for the separation of the transverse slits causes the separation of the sheet and continuing rollup of the crop put the final layer of adhesive against the crop roll to seal the collection. Thus, FIGS. 18a, b and c show permanent adhesive 56 against the wrapping material proceeding in the linear direction Y, and they show release liner 58 against the wrapping material proceeding in the rotational direction. In turn, FIG. 19 shows the result, with permanent adhesive 56 attached to a first surface of wrapping material 50, and release liner 58 attached to a second surface of the wrapping material.

Figure 19:
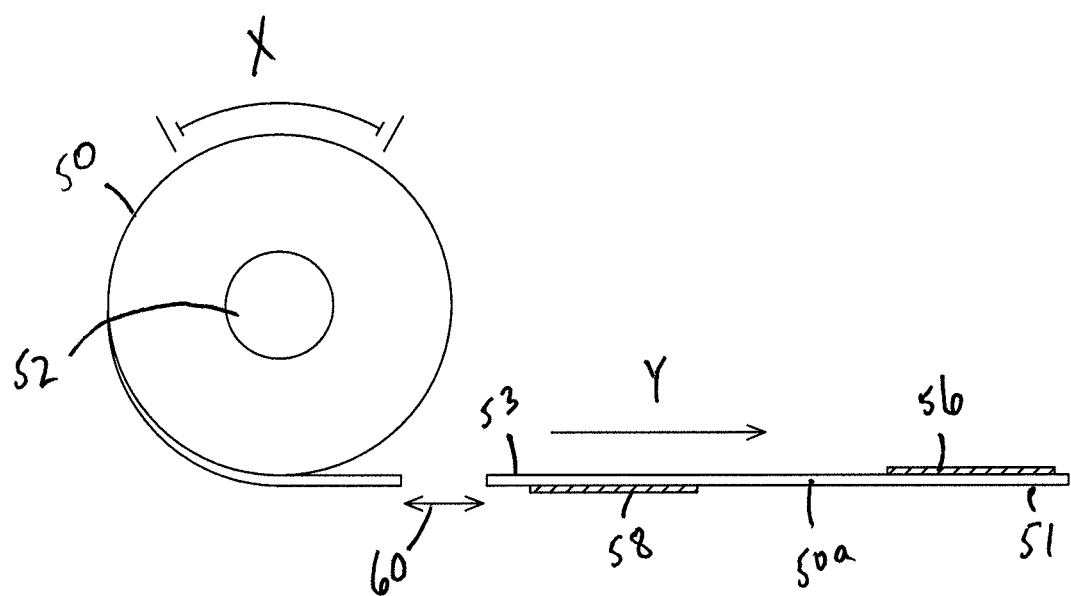
FIG. 19 is a cross sectional view of the complete separation of wrapping material substrate from wrapping material substrate from wrapping material roll at transverse slits with permanent adhesive on upper surface of wrapping material substrate.

FIG. 19 illustrates the separation of the transverse slits described above in the final wrap-up of the collected crop showing the action of the separation of the transverse slits. Accordingly, FIG. 19 shows complete separation of a wrapping material segment from the wrapping material roll at the transverse lines, such as slits or scoring as non-limiting examples, with permanent adhesive 56 carried on a first surface of the wrapping material segment and the release liner 58 carried on a second surface opposite the first.

Figure 20A:
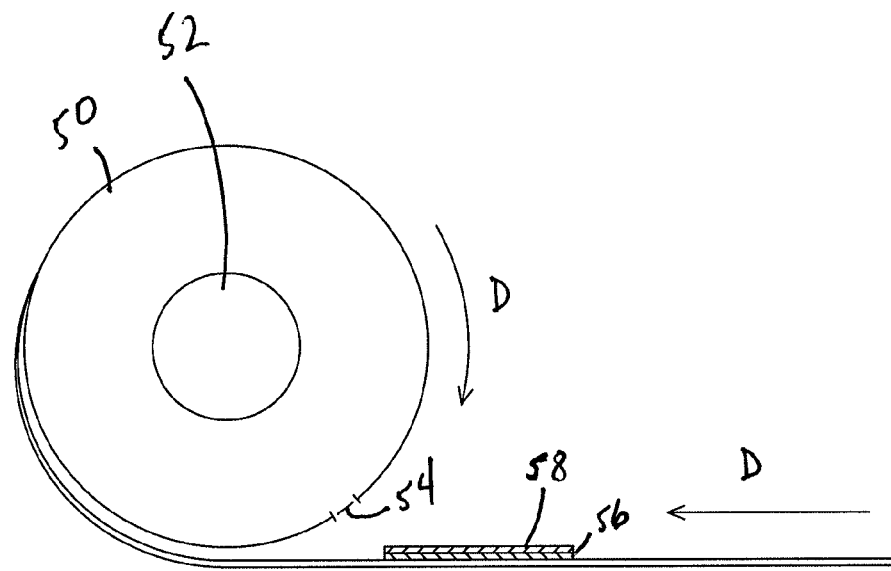
FIGS. 20A, 20B and 20C include cross sectional views of the illustration of the wind-up phase of the adhesive strips and transverse slits with releasable liner with permanent adhesive against wrapping material.
Figure 20B:
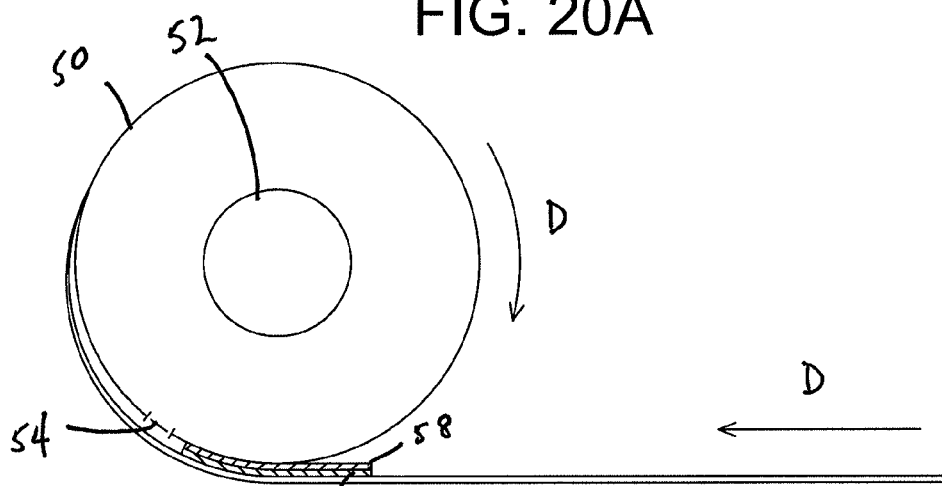
Figure 20C:
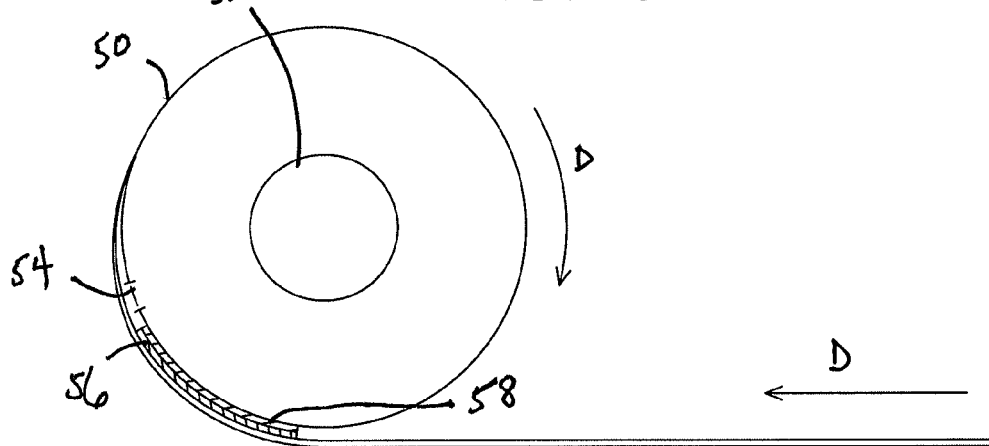
Figure 22:
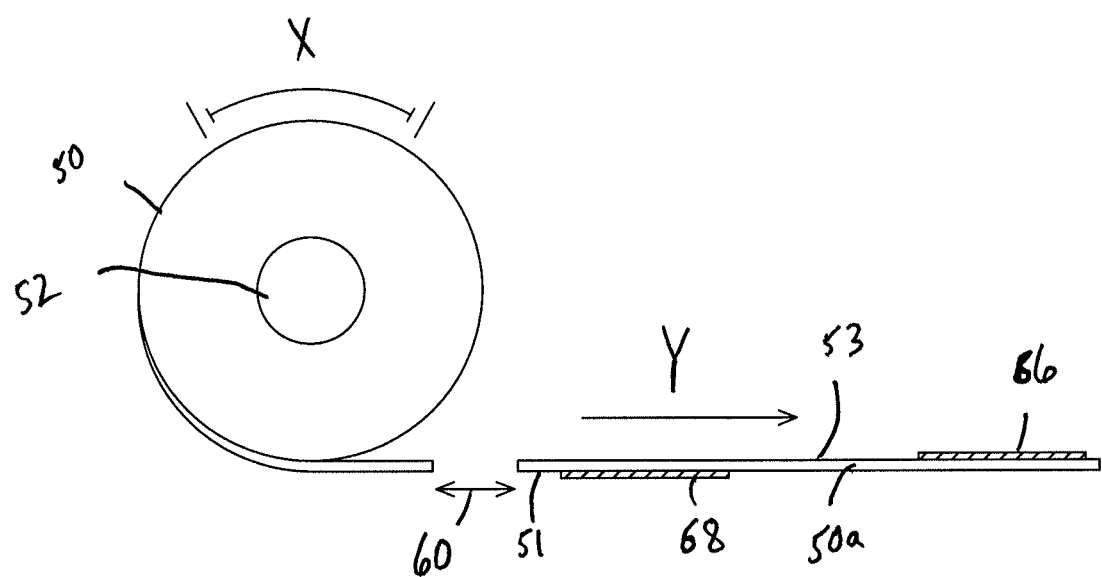
FIG. 22 is a cross sectional view of wrapping material substrate separation from wrapping material roll at transverse slits with permanent adhesive on lower surface of wrapping material substrate.

FIGS. 20A, B and C illustrate the windup phase (in direction D) of the adhesive area(with a first layer 66 to which a release liner, such as 8a in FIG. 16B, is attached with a second adhesive layer 68 applied to the liner layer, again, a day of FIG. 16B) and transverse slits 54 with the releasable liner with permanent adhesive against wrapping material substrate 50 (that allows for the permanent adhesive to reside on the upper side of the separated wrapping margin 50 of FIG. 22).

Figure 21A:
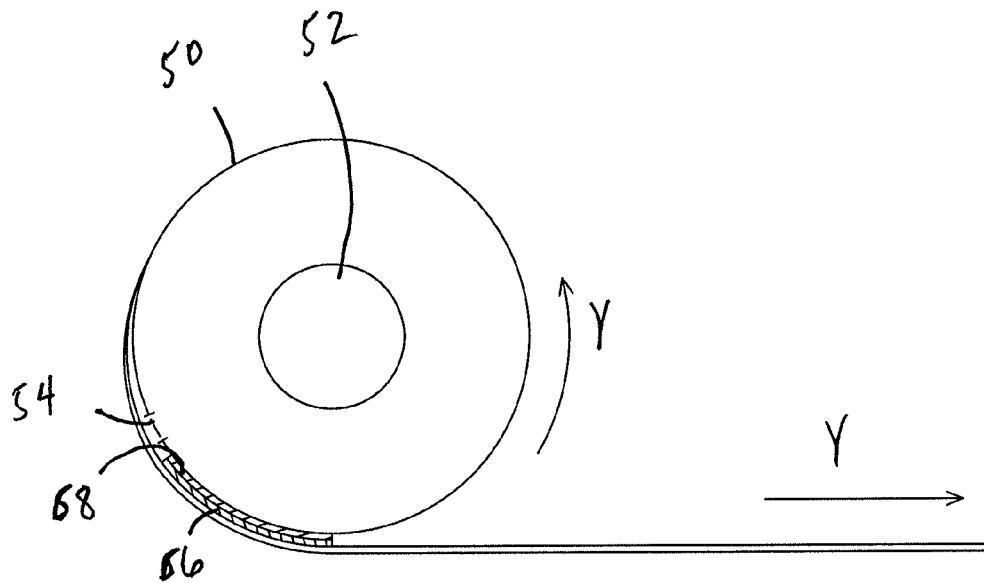
FIGS. 21A, 21B, and 21C include cross sectional views of the unwind phase of adhesive area and transverse slits with releasable liner with permanent adhesive against wrapping material substrate.
Figure 21B:
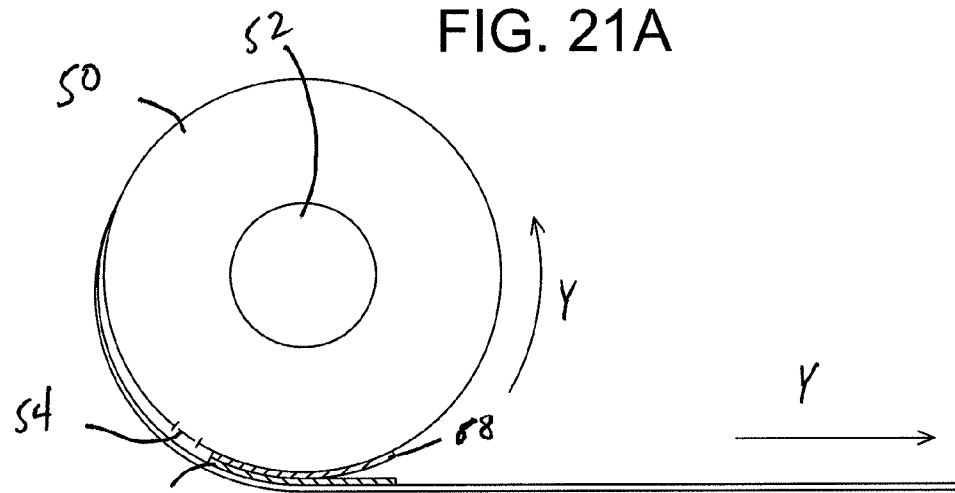
Figure 21C:
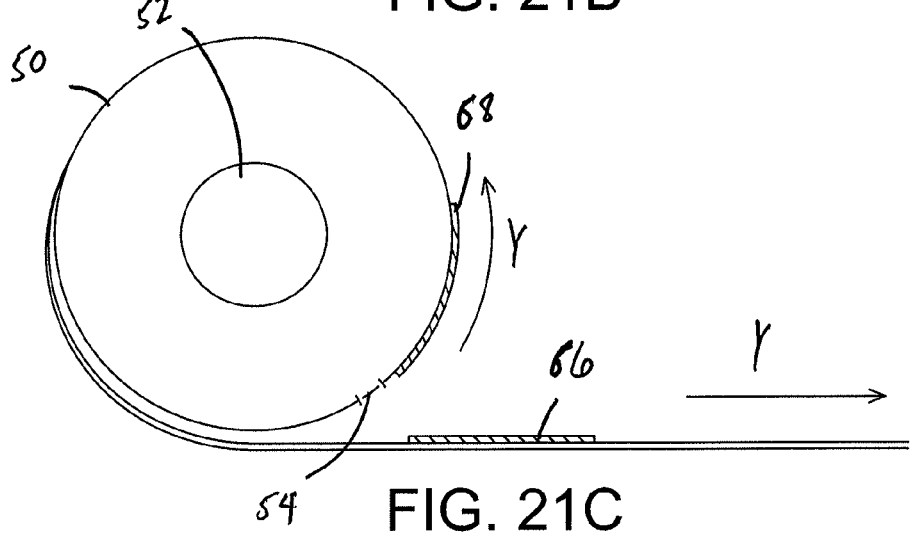

FIGS. 21a, b and c illustrate the unwind phase of the adhesive area and transverse slits with releasable liner with permanent adhesive against the wrapping material substrate. Accordingly, the unwind phase in this embodiment is shown with release liner 66 adhered to the wrapping material substrate and permanent adhesive 68 attached to the release liner prior to separation as shown in FIG. 21a, as the roll 50 moves in a direction Y. In turn, FIG. 21b and c show the separation of permanent adhesive 68 from release liner 66. For example, FIG. 21c illustrates release liner 66 attached to a part of the segment moving in the linear direction Y, while the release liner 68 is moving rotationally. The end result is seen in FIG. 22, where the release liner 66 is shown on a first surface of the wrapping material and the permanent adhesive 68 is carried on a second surface opposite the surface the release liner is carried upon.

Figure 17C:
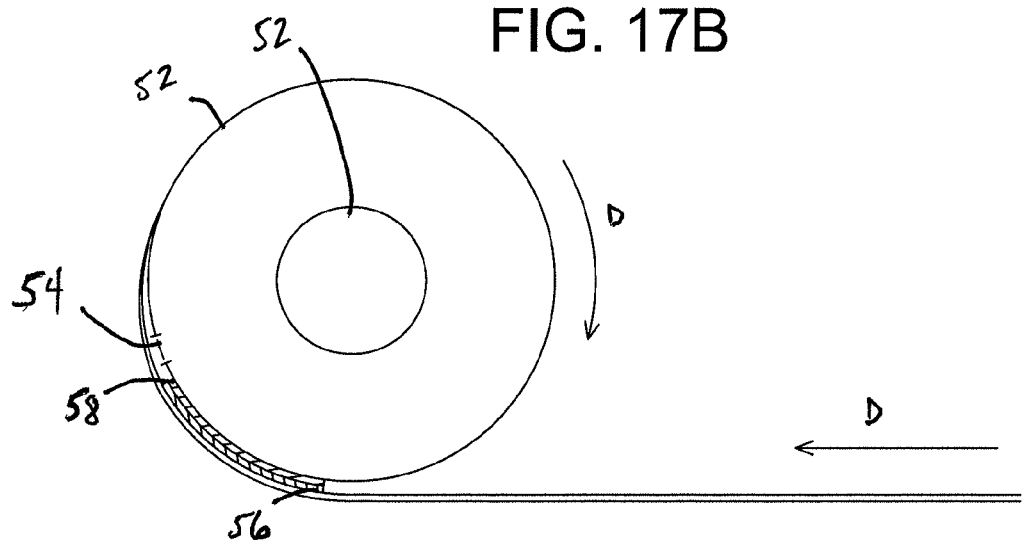
Figure 18B:
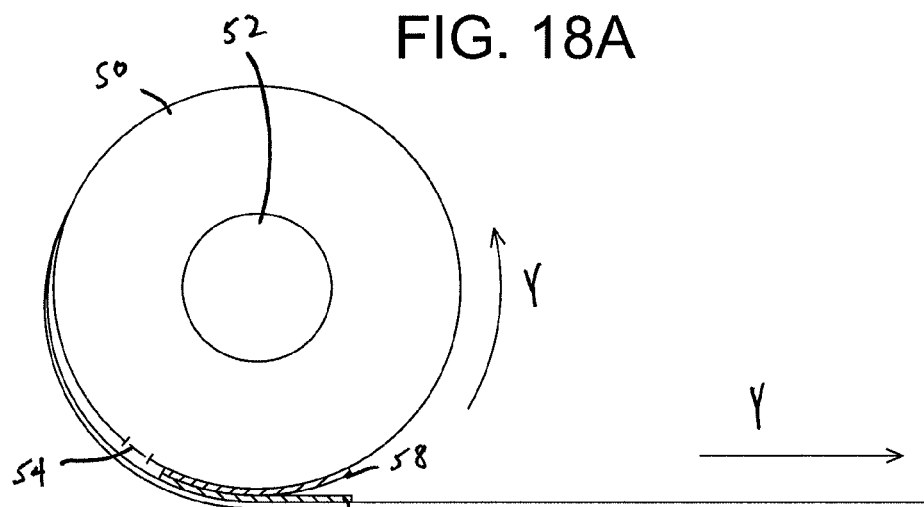
Figure 18C:
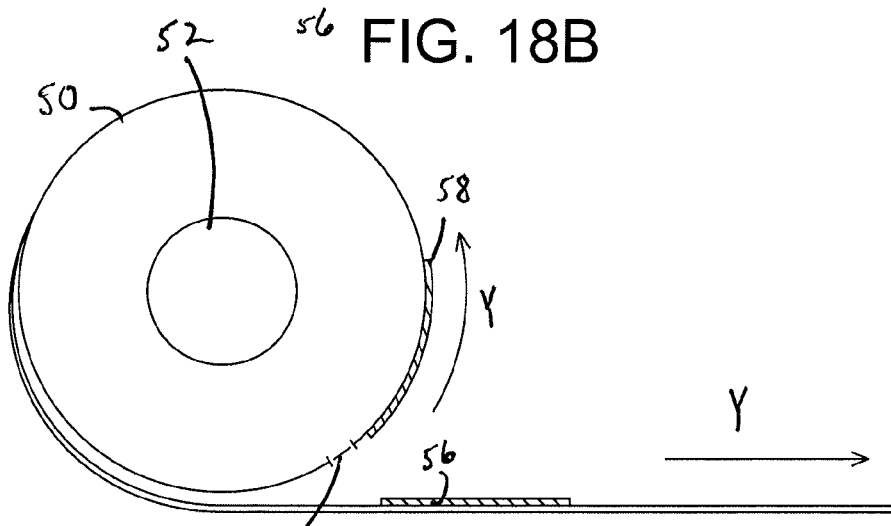

FIG. 22 illustrates the complete separations of wrapping material substrate from wrapping material roll at the transverse slits with permanent adhesive on the lower surface of the wrapping material substrate. Accordingly, it will be observed that in this embodiment, different from the embodiment of FIGS. 17-19, the positioning of the release of the liner and the permanent adhesive is reversed in terms of which surface is occupied by each one.

Figure 23A:
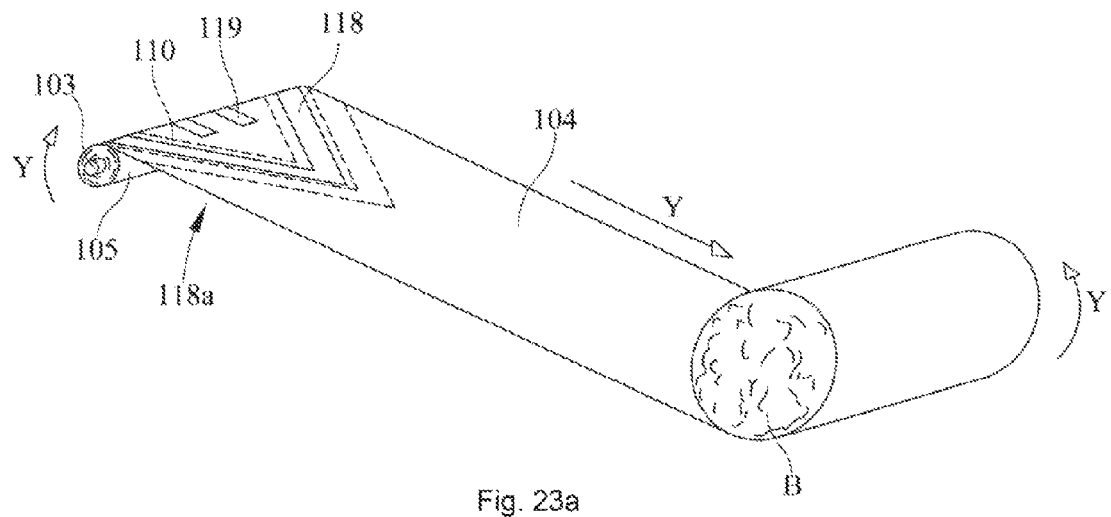
FIGS. 23a and 23b are perspective views illustrating the utilization of a transverse line of slits as the wrapping segment separation event.
Figure 23B:
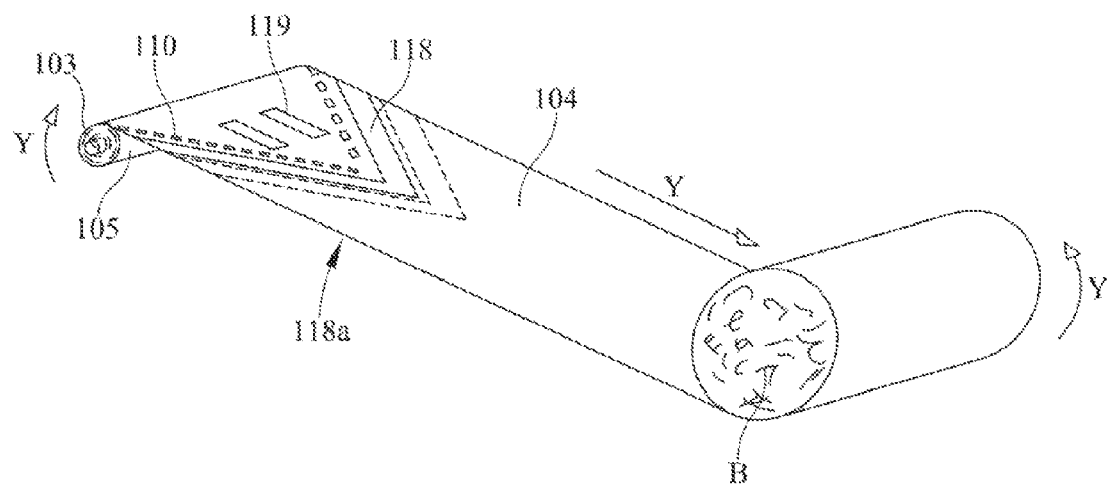

FIGS. 23a and b illustrate the utilization of a transverse line of slits as the wrapping segment separation event. In the FIG. 23a, the wrapping material is comprised of a triangular or angular separation line and adjacent the angular line of transverse slits is the layer of permanent adhesive. Illustrated are the upper and lower layers of permanent adhesive as well as two recoil dampening strips 118. These dampening strips 118 may be included if reinforcement of the area of wrapping material is needed to reduce recoil.

Figure 24A:
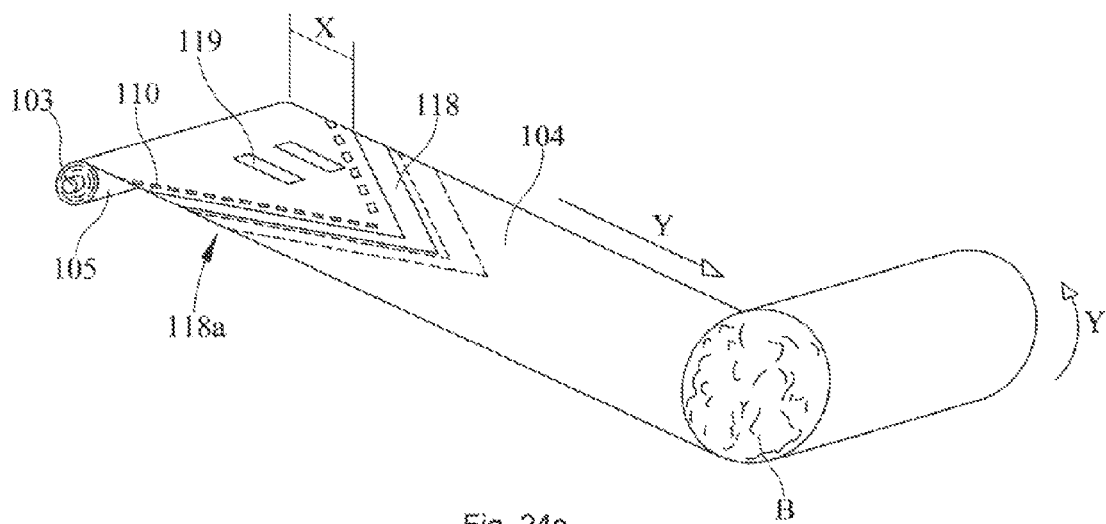
FIGS. 24a and 24b are perspective views illustrating the separation action as the wrapping segment parts from the roll material.
Figure 24B:
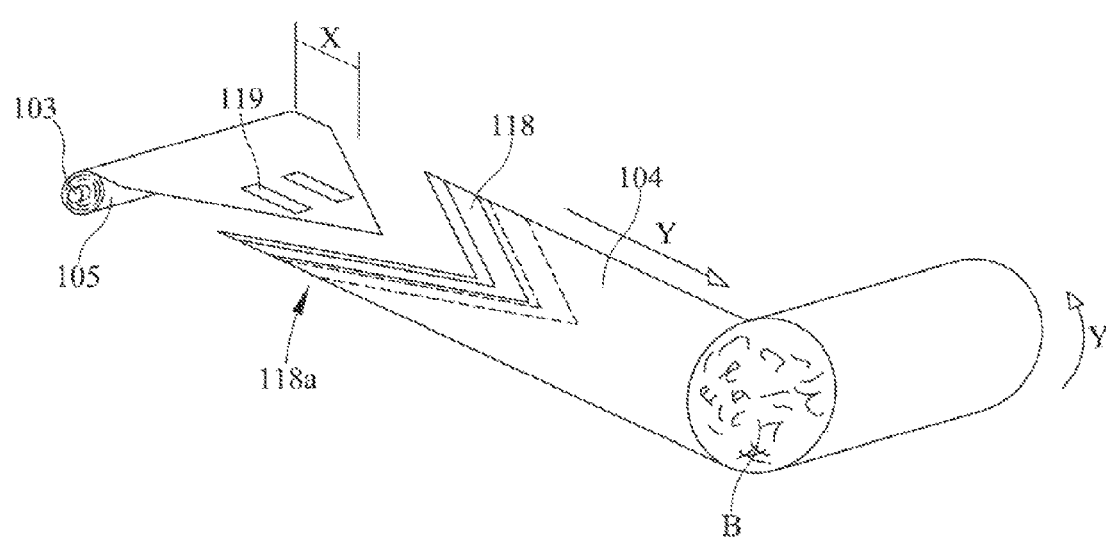

FIG. 24a and FIG. 24b illustrate the separation action as the wrapping segment 104 parts from the roll material 105. Of note here is the actual form of the transverse separation may be other than the illustrated angle. Separation of particular wrapping materials may be better suited by other combinations of connected, curved or straight line segments making up the actual separation. FIG. 24b shows the nearly completed wrap of the bale, B. The substrate 104 includes the lower adhesive 118a and the upper adhesive 118 to contact the substrate 104 for secure wrapping. The wrapping source 105 remains in place and stopped, denoted by X, awaiting take up for another bale while on the role 103.

Figure 25A:
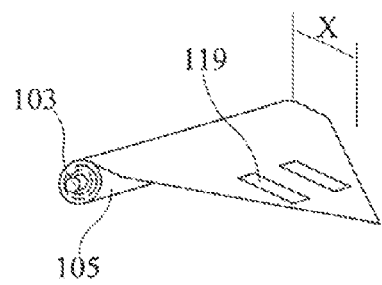
FIGS. 25a and 25b are perspective views illustrating the finally completed roll up of the collected crop and the beginning end of the next wrapping segment.
Figure 25A:
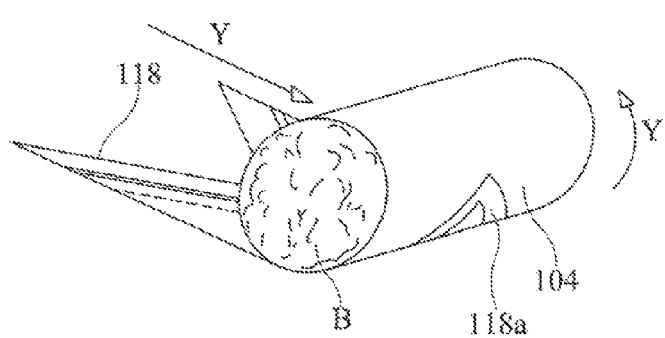
Figure 25B:
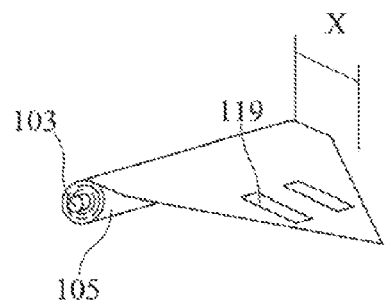
Figure 25B:
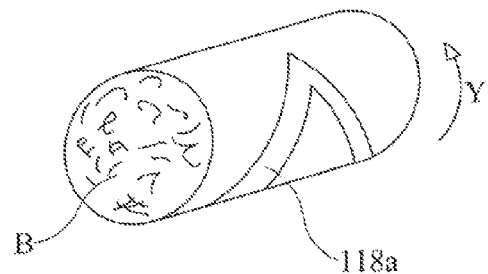

FIG. 25a illustrates the wrapping segments after they have separated, and FIG. 25b illustrates the finally completed roll up of the collected crop, B, and the beginning end of the next wrapping segment 10S.

Figure 26A:
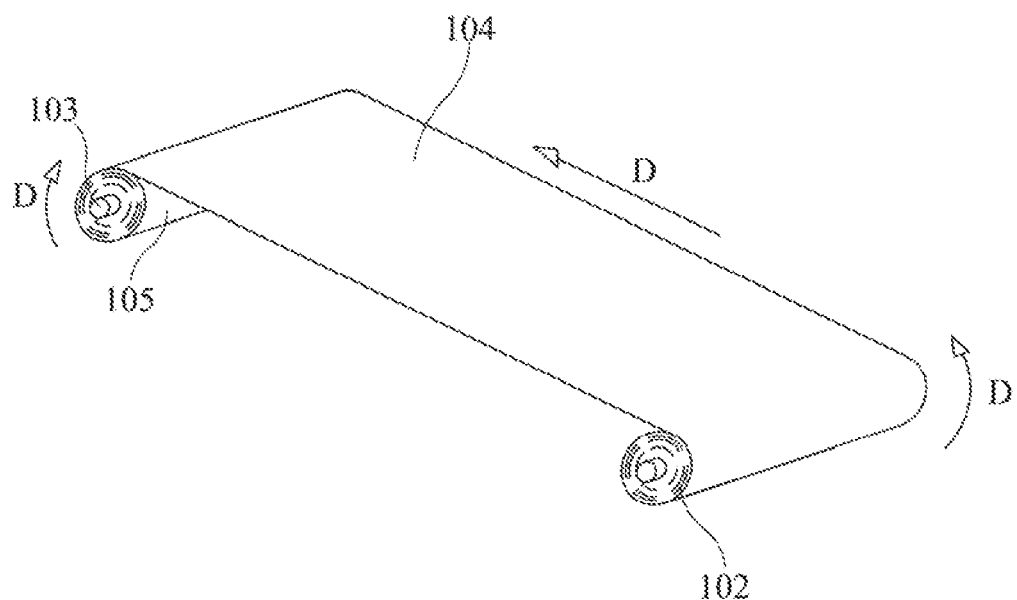
FIGS. 26a and 26b provide perspective views illustrating of the make up of an alternative of the separation slit pattern.
Figure 26B:
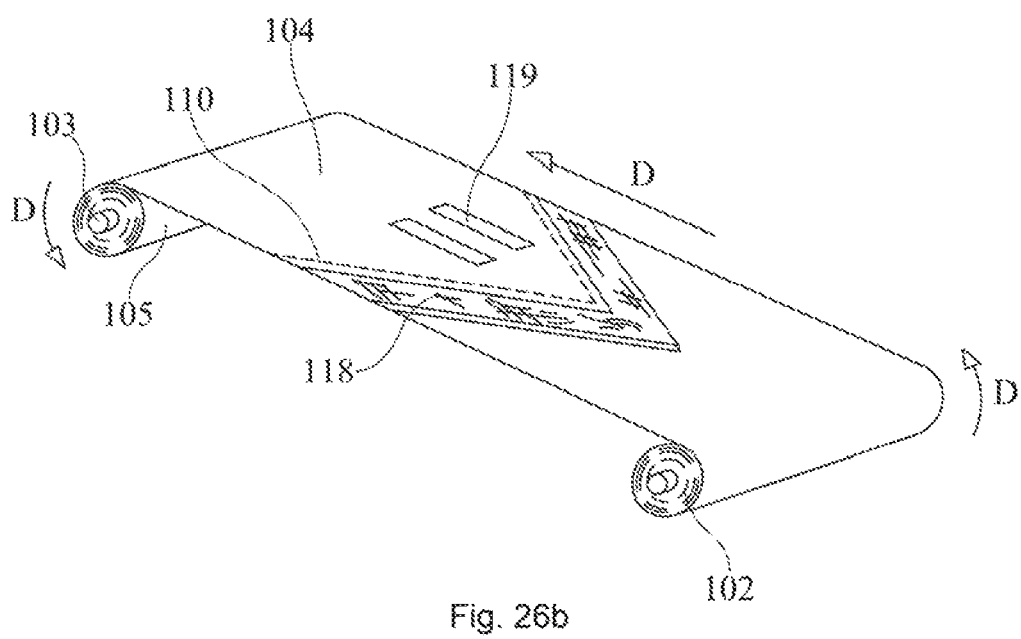

FIGS. 26a and 26b thus show a further illustration of the make-up of an alternative of the separation slit pattern 110 (as in FIGS. 23a and b, and FIG. 24a, for instance). The material supply 102 is provided as the substrate 104 that wraps around a roll 103 as a wrapping material source 105. In FIG. 26b, the separation area 110 is viewed with a similarly configured adhesive area 118 and dampening panels 119.

The disclosed embodiments are to be considered in all respects as illustrative and not restrictive. Several embodiments are described and illustrated and suggest that there are others within the scope of the invention which meet particular requirements of an application which do not depart from the scope of the invention. The variety of adhesive configurations are illustrative of alternative solutions to the securing of a wrapper on a bale. These are matters of design choice prompted by the characteristics of the material and contents of the bale being covered and its ultimate physical location. The scope of the invention is to be defined by the appended claims rather than the foregoing descriptions and other embodiments which come into the meaning and range of equivalency of the claims are therefore intended to be included within the scope thereof.

What is claimed is:

1. A harvested product rolled wrapping material, comprising:
   a roll of wrapping material having a first surface and a second surface, the wrapping material divided into wrapping segments where there is not a fold formed between consecutive wrapping segments;
   a release liner attached to the wrapping material;
   a permanent adhesive;
   wherein the roll is configured so that a winding phase marked by rotation of the roll in a first direction leaves the permanent adhesive in contact with the release liner and positioned between the release liner and the wrapping material;
   wherein after an unwinding phase marked by rotation of the roll in a second direction, the permanent adhesive is separated from the release liner, leaving the release liner attached to the first surface of the wrapping material and the permanent adhesive attached to the second surface of the wrapping material for securing the wrapping material to itself; and
   wherein the wrapping material is divided into the wrapping segments by breaking a surface of the wrapping material, and the breaking of the surface of the wrapping material is positioned separate from the permanent adhesive, and wherein the roll is further characterized in that no adhesive is over a position marked by breaking of the wrapping material surface.

2. The wrapping material of claim 1, wherein slits provide for the breaking of the wrapping material.

3. The wrapping material of claim 1, wherein scoring provides for the breaking of the wrapping material.

4. The wrapping material of claim 2, wherein said slits form transverse lines of periodic transverse slits.

\* \* \* \* \*